Oct. 24, 1939.   P. E. KLOPSTEG   2,177,368
SPARK TIMER
Original Filed May 16, 1929   2 Sheets-Sheet 1

INVENTOR
PAUL E. KLOPSTEG
BY *Mann, Brown & Co.*
ATTYS.

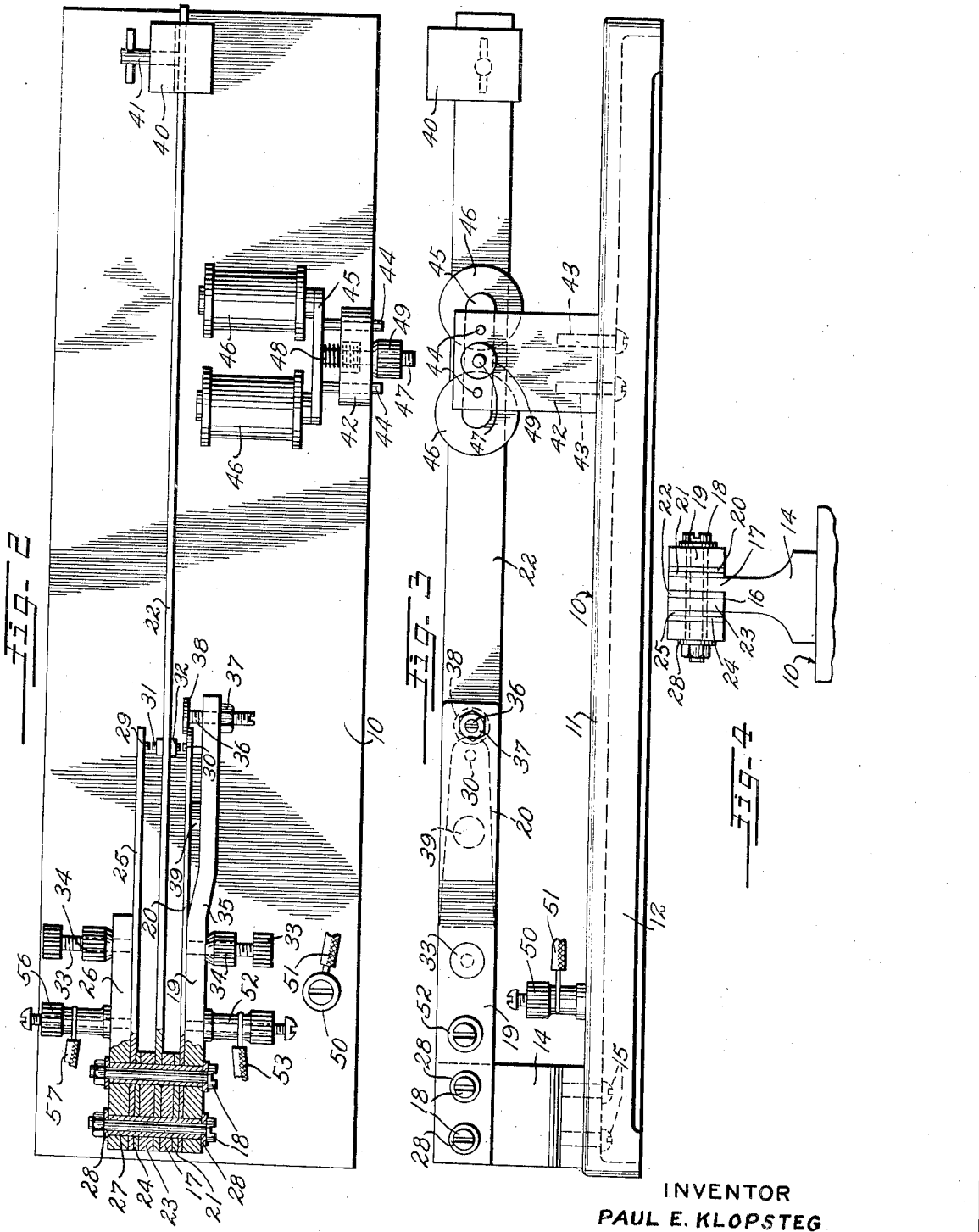

Patented Oct. 24, 1939

2,177,368

UNITED STATES PATENT OFFICE 2,177,368

SPARK TIMER

Paul E. Klopsteg, Chicago, Ill., assignor to Central Scientific Company, a corporation of Illinois Original application May 16, 1929, Serial No. 363,688. Divided and this application December 5, 1935, Serial No. 53,111

3 Claims. (Cl. 175—373)

This invention relates to electrically operated timing devices for use in recording the movement of bodies and the like.

One of the objects of the invention is the provision of a new and improved spark timing device for delivering electric sparks to a spark sensitive record receiving means at equal intervals of time for recording the travel of said means during each of these time intervals.

Another object of the invention is the provision of a new and improved device for automatically opening and closing electric circuits at predetermined intervals of time.

A further object of the invention is the provision of a new and improved spark timer device for delivering electric sparks to a record receiving means at predetermined intervals of time together with novel means for varying the length of such intervals.

Another object of the invention is the provision of a new and improved spark timer that is simple in construction, inexpensive to manufacture, easily installed, accurate and efficient in operation, and that is composed of a minimum number of parts.

Further objects and advantages of the invention will become apparent as the disclosure proceeds and the description is read in connection with the accompanying drawings in which Fig. 1 is a diagram illustrating the application of the fundamental principles to a moment of inertia machine, inclined plane and horizontal plane acceleration and velocity devices, and an Atwood machine for determining the laws of falling bodies, together with a spark timer constituting the subject matter of this invention;

Figs. 2, 3 and 4 are respectively plan, side elevation and end elevation of the preferred form of the spark timer;

Fig. 2 is a plan view with the cover removed, of the preferred form of an impulse counter used in connection with the spark timer;

Fig. 3 is a vertical section taken on the line 6—6 of Fig. 5; and

Fig. 4 is a plan view of the cover of the impulse counter shown in Figs. 5 and 6.

Figure 1:
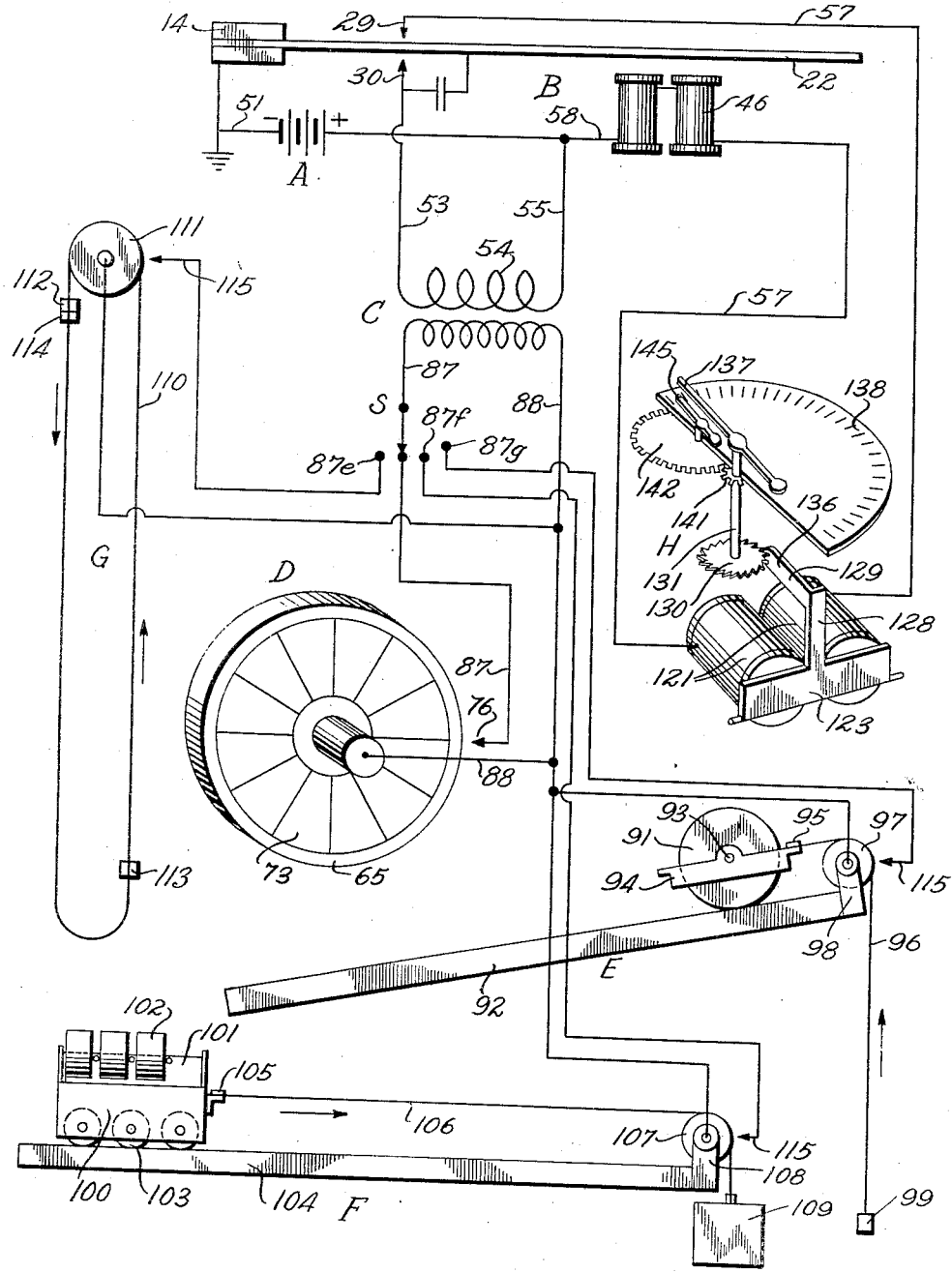

The specific illustration and the correspondingly specific description are used for the purpose of disclosure only, and it is realized that the substance of the invention may be embodied in other forms and put to other applications.

A general organization showing the application of the device is illustrated in Fig. 1 which shows a source of current represented by the battery A, a spark timer indicated generally by B, (illustrated in detail on sheet 2), which opens the primary circuit of a spark coil, indicated generally by C, the secondary of which delivers sparks to a record receiver associated with a moment of inertia machine, generally indicated by D, an inclined plane acceleration device, indicated generally by E, a horizontal plane velocity device, indicated generally by F, and an Atwood machine for determining the laws for falling bodies, indicated generally by G; and associated with the spark timer B, is an impulse counter, generally indicated by H.

This application is a division of my application, Serial No. 363,688, filed May 16, 1929, which matured in United States Letters Patent No. 2,024,230, dated December 17, 1935.

Referring now more particularly to Figs. 2, 3 and 4 in which the spark timer is shown in detail, and it will be seen that the timer has a massive base 10, which comprises a web 11, side flanges 12, and suitable end flanges connecting the side flanges. A stout bracket 14 is secured to the web adjacent to one end by screws 15, and is cut away adjacent to the top (Fig. 4), as indicated at 16, to leave a flat upstanding arm 17, perforated to receive bolts 18 which secure to it (Fig. 2) a rigid arm 19, a resilient arm 20, an insulating plate 21, a vibrating bar 22, a filler block 23, an insulated plate 24, a resilient arm 25, and a rigid arm 26. The bolts 18 are also equipped with insulating tubes 27 and insulating washers 28.

Adjacent to their free ends the resilient arms 20 and 25 are equipped with tungsten contacts 29 and 30 adapted to cooperate with similar contacts 31 and 32 carried by the vibrating bar 22.

The rigid arms 19 and 26 are equipped with adjusting screws 33, the points of which bear on the resilient arms 20 and 25 respectively, to adjust the position of the contacts 29, 30 and the adjusted positions may be made secure by the lock nuts 34.

The rigid arm 19 is projected beyond the free end of the arm 26, bent laterally at 35, and equipped at its free end with an adjusting screw 36 having a check nut 37, and a flat head 38, adapted to form a positive limit to upward movement of the contact 30 in Fig. 2. The arm 19 is also fitted with a yielding pad 39 adapted to damp vibrations of the resilient arm 20.

One or more slotted loading masses 40 may be mounted on the bar 22 and secured in adjusted position by screws 41 to vary the period of vibration of the bar.

A second bracket 42 is secured to the web adjacent the right end in Figs. 2 and 3 by screws 43, and is perforated to receive rods 44, carried by the base 45 of electromagnets 46. The base 45 is also equipped with a screw 47 passing through a helical spring 48 and the bracket 42, and equipped with a thumb nut 49 by which the position of the magnet may be adjusted.

A binding post 50 on the base 10 is electrically connected with the bar 22 through the bracket 14, and may be connected by a wire 51 (Fig. 1) with one side of the battery A. A binding post 52 on the arm 19 (Fig. 2) may be connected by a wire 53 (Fig. 1) with the primary 54 of the spark coil C which, in turn, may be connected by a wire 55 with the opposite side of the battery A. With such connections, it will be clear that downward movement of the bar 22 in Fig. 2 will bring the contacts 30 and 32 together to close the circuit through the battery A, and the primary 54, which circuit will remain closed until, on the reverse movement of the bar 22, the resilient arm 20 is positively stopped by the head 38, when the circuit is broken, with the familiar results in the secondary and any circuit including it.

A third binding post 56 (Fig. 2) may be connected by a wire 57 (Fig. 1) directly or indirectly with the windings of the magnets 46 which, in turn, may be connected by a wire 58 to the battery A. With such connections, it will follow that upward movement of the bar 22, in Fig. 2, will close the contacts 31 and 29, and thereby close the circuit through the battery A and the magnet 46 energizing the latter, and giving a downward impulse to the bar 22. It will also follow that on the opposite phase of the bar's vibration, the circuit through the driving magnet 46 will be closed, causing the bar to return and complete the oscillation.

The adjustability of the magnet 46 with respect to the bar and the adjustability of the contacts 30 and 29 with respect to the contacs 31 and 32 enables the user to secure absolutely reliable operation without cut and try methods.

The invention may be employed in numerous relations and with various types of devices. In Fig. 1 is shown the application of the invention to several different devices which will illustrate its wide range of use and adaptability.

The spark coil or transformer C is provided with the secondary winding having the leads 87 and 88. Suitable switches or contacts 87e, 87f, 87g or 87h, shown diagrammatically in Fig. 1 are employed for closing the secondary or sparking circuit through the coil or transformer C.

An incline plane accelerator device is shown at E and comprises an incline track 92 along which a massive roller 91 is adapted to travel. The roller is journalled as at 93, in a frame 94. A sensitized strip or record receiving member 96 is attached to the frame as at 95, and passes over a pulley 97 mounted on a bracket 98 at the upper end of the track 92. A light weight 99, attached to the lower end of the strip 96, insures the proper travel of the strip over the pulley.

The conductor 88 is electrically connected with the pulley 97 over which the strip 96 travels, and spark point device 115 which is electrically connected to the switch. Contact 87g is arranged adjacent to the pulley so that when the switch S is moved to engage the contact 87g, the electrical impulse caused by the vibration of the member 22 will cause sparks to pass from 115 through the strip into the pulley, thereby recording along the sensitized strip the impulses as the same pass over the pulley as the weight 91 rolls down the track.

A horizontal plane or velocity device, is shown at F and comprises a horizontal track 104, along which a mass 100, supported by anti-frictional rolls 103 is adapted to move under the influence of weight 109 which is attached at one end of a sensitized strip 106, the other end of which is connected to the mass as at 105.

The strip 106 passes over roll 107 journalled to bracket 108 at the outer end of the track 104. The mass may be varied by removable weights 102, which are adapted to engage support 101 on the mass 100.

The lead 88 of the transformer or coil C is in electrical connection with the pulley 107 and switch 87f is in connection with the spark device 115 which operates the roll 107. The weight is adapted to move the mass 100 along the track and simultaneously the sparking device 115 will deliver sparks which are controlled by the vibrating bar 22 to the record receiving strip 106.

An inertia device is shown at D and comprises a rotating mass 73 having a circular periphery 65 on which the record receiving member may be secured. The rotating mass is in electrical connection with the secondary coil of the transformer by the lead 88 and a sparking device 76 opens the periphery of the rotating masses in electrical connection with the switch 87h through the conductor 87'. When the device is in the position shown in Fig. 1, with the switch S in engagement with the contact 87h, sparks will be delivered to the sensitized strip or sheet during the rotation of the mass.

An Atwood machine is shown at D and comprises a pulley 111 over which a sensitized record receiving strip or band formed in a loop, is adapted to travel. This strip is provided at different points with balancing weights 112 and 113, one of which is augmented by the addition of a driving weight 114. The weight 114, under the influence of gravity, will cause the strip to travel over the roller and a sparking device 115 will deliver sparks through the same, which are controlled by the operation of the vibrating bar 22.

The vibrating bar 22 is adapted also to control the operation of an impulse counter H, which comprises an electro-magnet 121 which is adapted to control the operation of the armature or vibrator 123, which is adapted to rock on pivot bearings 124.

The armature 123 is provided with an arm 128 having attached thereto a pawl 129 having a curved end 136 which is adapted to engage a ratchet 130 on the shaft 131 of a needle or pointer 137 which rotates over scale 138. The shaft 131 may, if desired, be provided with pinion 141 which meshes with the gear 142 which is adapted to rotate a charter or pointer 145 running over a smaller scale.

It is thought from the foregoing taken in connection with the accompanying drawings that the construction and operation of my device will be apparent to those skilled in the art and that changes in size, shape, proportion and details of construction may be made without departing from the spirit and scope of the appended claims.

I claim as my invention:—

1. In apparatus of the class described, a secondary circuit including a spark gap, a primary circuit including a source of current, a vibrator, a contact carried by the vibrator, a second contact adapted to close with the first contact, a resilient support for the second contact, means to limit the movement of the second contact in one direction, an auxiliary circuit including the vibrator, an electro-magnet adjacent to the vibrator, a third contact carried by the vibrator, a fourth contact adapted to cooperate with the third to close a circuit through the magnet, and an impulse counter including an electro-magnet energized when the third and fourth contacts engage for counting the vibrations of said vibrator.

2. In apparatus of the class described, a secondary circuit including a spark gap, a primary circuit including a source of current, a vibrator, a contact carried by the vibrator, a second contact adapted to close with the first contact, a resilient support for the second contact, means independent of said contacts to limit the movement of the second contact in a direction toward said first-named contact, an auxiliary circuit including the vibrator, an electro-magnet adjacent to the vibrator, a third contact carried by the vibrator, and a fourth contact adapted to cooperate with the third to close a circuit through the magnet.

3. In apparatus of the class described, a base, a bracket on the base, a resilient bar supported at one end on the bracket, first and second contacts carried by the resilient bar, a yielding arm supported on the bracket at one side of the resilient bar, a third contact carried by said yielding arm adapted to cooperate with the first contact on the bar, an adjustable stop limiting the movement of the third contact toward said first-named contact, a second yielding arm on the opposite side of the resilient bar from the first, and a fourth contact carried by the second arm and adapted to cooperate with the second contact on the resilient bar.

PAUL E. KLOPSTEG.